United States Patent [19]

Spinas

[11] Patent Number: 4,705,281
[45] Date of Patent: Nov. 10, 1987

[54] CARRYING AID FOR SKIS

[76] Inventor: Stefi Spinas, Schloesslistrasse 17, CH-8044 Zürich, Switzerland

[21] Appl. No.: 863,855

[22] Filed: May 16, 1986

[30] Foreign Application Priority Data

Jun. 5, 1985 [CH] Switzerland ............ 2376/85

[51] Int. Cl.4 ............................. A63C 11/10
[52] U.S. Cl. ............... 280/47.13 R; 224/917; 280/37; 280/814
[58] Field of Search ........ 280/47.13 R, 814, 37; 224/917; 16/34, 32, 19

[56] References Cited

U.S. PATENT DOCUMENTS

| 1,058,837 | 4/1913 | Zikmund | 16/34 |
| 2,596,578 | 5/1952 | McIntyre et al. | 280/37 |
| 3,114,487 | 12/1963 | Miller et al. | 280/814 |
| 3,920,166 | 11/1975 | Hogensen | 224/917 |
| 4,097,955 | 7/1978 | Foge | 280/37 |
| 4,540,198 | 9/1985 | Kyburz | 280/814 |

FOREIGN PATENT DOCUMENTS

| 443498 | 4/1927 | Fed. Rep. of Germany | 280/814 |
| 1299186 | 6/1962 | France | 280/814 |
| 2471796 | 6/1981 | France | 280/814 |
| WO82/04401 | 12/1982 | PCT Int'l Appl. | 280/814 |
| 581487 | 11/1976 | Switzerland | 280/814 |

Primary Examiner—David M. Mitchell
Attorney, Agent, or Firm—Bernard, Rothwell & Brown

[57] ABSTRACT

The carrying aid includes a roller device (2) with a housing (10) having two side walls (11, 12). Adjacent the lower edge (23) of the side walls (11, 12) is a floor element (16) which is pivotable on a laterally running pin (15). A fork (28) of a roller wheel (33) is mounted in the floor element (16) so as to be pivotable about an axis (31) which is perpendicular to the roller axis (32) and to the pin (15). The floor element (16) is secured by a stop (18, 19) and by a lockable detent means (20). A clamp strap (38) having a clamp lock (43) is guided in a groove (37) of the side walls (11, 12). By this means the housing (10) can be clamped to the rear end of a pair of skis. The pivotable roller (33) makes the guiding of the skis more comfortable. In addition, a carrying strap with a carrying loop can be attached to the skis above the bindings. In this manner the skis can be transported comfortably.

3 Claims, 5 Drawing Figures

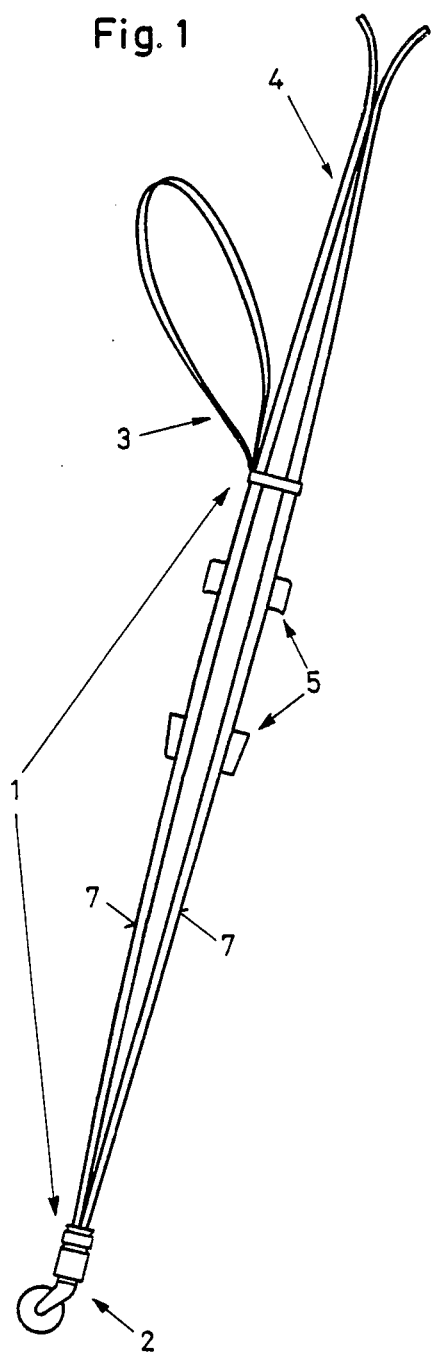
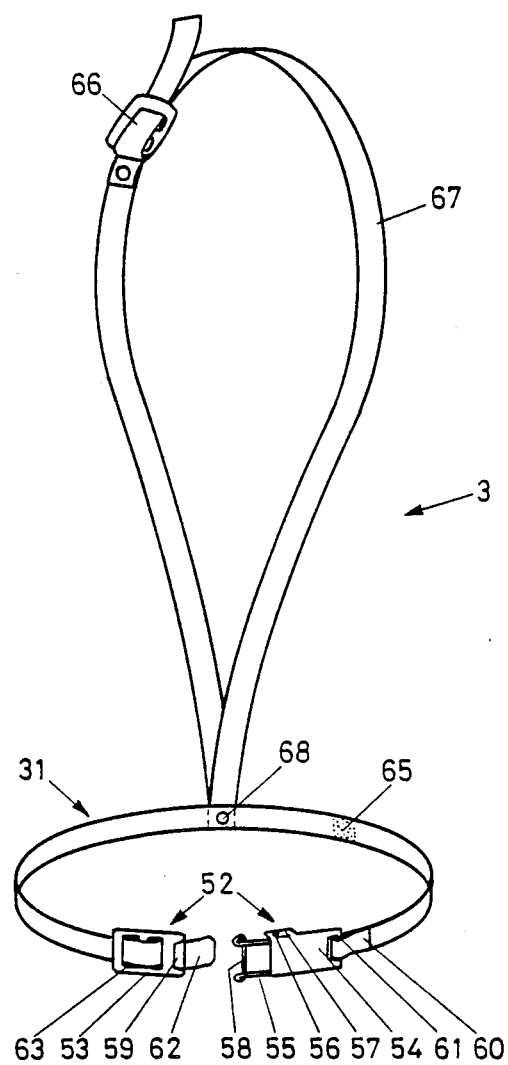

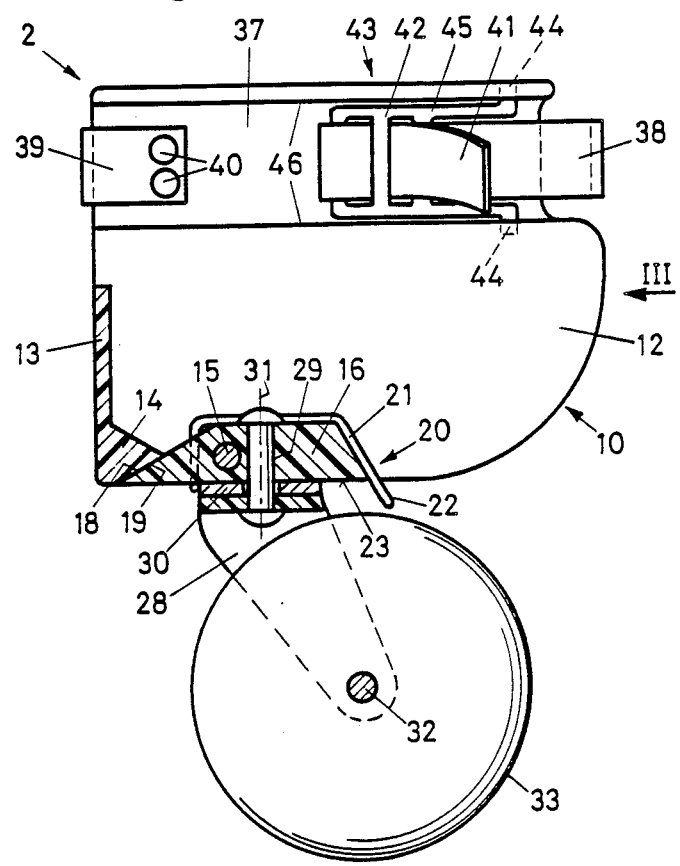
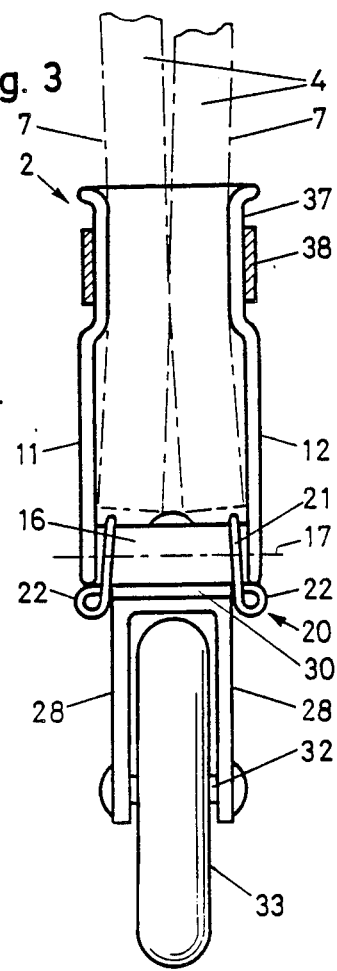
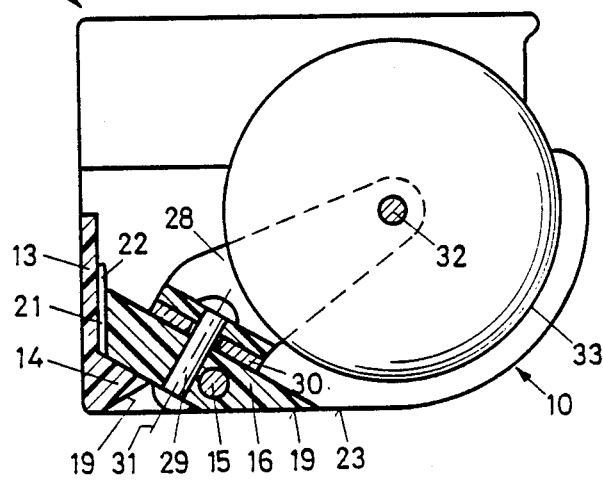

CARRYING AID FOR SKIS

A carrying aid is taught in WO-A No. 82/04401. Disclosed therein is a roller device which is attached to the lower end of a pair of skis. In one embodiment this device is formed as a two-part housing with a floor piece. The two housing halves are pushed over the skis from the side or from the bottom and are attached to the pair of skis by means of a small rubber strap. A roller fork with a roller mounted therein is pivotably mounted in each housing half. When not in use, the fork, together with the roller, can be pivoted into the housing in order to reduce the volume of the device. In its outwardly pivoted position the fork is held in position by its abutment against the end of the pair of skis. With this embodiment rollers of only a relatively small diameter can be used. When the pair of skis is inclined, the floor pressure exerts such a large torque on the fork, particularly when traveling over uneven surfaces, that the housing is pushed downward and away from the end of the skis. In addition, it is tiring to guide the skis. If the bottom surfaces of the skis are not held parallel to the direction of movement, the roller rolling on the ground wanders laterally away.

Additional proposals for roller devices for skis are presented in the other exemplary embodiments of the cited WO-A No. 82/04401, although all of them are more voluminous and also have the disadvantage of difficulty in guiding the skis.

A further roller device for skis is taught in CH-A No. 581,487, FIGS. 4 and 5. In this device the housing is also made of two parts and the two U-shaped housing halves can be pivoted downward through 180 degrees over the forks of the rollers, in order to reduce the transport volume. This device also has the disadvantage of difficulty in guiding the skis.

The object of the invention is to further develop a carrying aid for skis in such a manner that it can be reliably attached to the end of a pair of skis, and that it makes it easier to guide the skis.

An exemplary embodiment of the invention is described below with the aid of the drawings. Shown therein are:

FIG. 1—a side view of a carrying aid mounted on a pair of skis,

FIG. 2—an enlarged illustration of the roller device in FIG. 1, in a partially sectional view, FIG. 3—a view in the direction of the arrow III in FIG. 2, FIG. 4—a sectional view according to FIG. 2, but with an inwardly pivoted roller, and FIG. 5—an enlarged illustration of the carrying strap in FIG. 1.

According to FIG. 1, the carrying aid 1 consists of a roller device 2 attached to the lower end of a pair of skis 4 and a carrying strap 3 attached above the bindings 5. However, the transport aid can also be used without the carrying strap 3. In this case it consists only of the roller device 2.

The roller device 2 is shown enlarged in the FIGS. 2 through 4. It includes a housing 10 made of thermoplastic plastic having two side walls 11, 12, which are connected with each other in one piece by a short cross piece 13 on one side and by a stop block 14 which closes off the bottom of the cross piece 13. A floor element 16 is pivotably mounted about an axis 17 running perpendicular to the side walls 11, 12, by means of a pin 15 adjacent the lower edge 23 of the side walls 11, 12. The floor element 16 has a stop surface 18, which abuts an opposing surface 19 of the stop block 14 when in the outwardly pivoted position illustrated in FIG. 2. The floor element 16 is secured in this position by a lockable detent device 20 in the form of a curved spring wire 21 having two clasp ends 22, which are bent to engage behind the lower edge 23 of the side walls 11, 12.

A fork 28 is mounted in the floor element 16 by means of a pin 29 and an axial slide mount 30 so as to be pivotable about an axis 31 lying perpendicular to the axis 17. In operation, (FIGS. 2 and 3) the axis 31 is arranged parallel to the longitudinal direction of the skis and approximately in the center of the underside of the housing. A roller 33 is rotatably mounted in the fork 28 by means of a rotation axis 32 which is perpendicular to the axis 31 and spaced therefrom.

The upper halves of the side walls 11, 12 are formed with a channel-like groove 37. A clamp strap 38 is held in the grooves 37. One end 39 of this clamp strap 38 is attached in the groove 37 of the wall 11 by rivets 40. The other end 41 is adjustably looped through a buckle 42 of a toggle catch 43. The free ends 44 of the lever 45 of the toggle catch 43, which is formed in one piece with the buckle 42, are pivotably mounted in the sides 46 of the groove 37 of the side wall 11 adjacent the outer edge.

The carrying strap 3 is shown enlarged in FIG. 5. It includes a clamp strap 51, both ends of which are attached to a toggle fastener 52. This toggle fastener 52 is formed as a toggle catch and consists of two parts, a hook 53 and a support 54 with a clamp clip 55 pivotably attached thereto. The free ends 56 of the clip 55 are pivotably mounted in bent tangs 57 of the support 54. A cross piece 58 of the clip 55 can be hooked into a bent tang 59 of the hook 53. By pressing the support 54 against the hook 53, the toggle catch snaps into a tensed position. One end 60 of the clamp strap is sewn to a cross piece 61 of the support 54. The other end 62 of the clamp strap is guided through openings 63 in the hook 53 and looped around a cross piece 64 separating the openings 63. In this manner the length of the clamp strap, and thereby the clamping force, can be adapted to the pair of skis to be carried. The clamp strap 51 can have a rubber layer 65 on its inner side. A carrying loop 67, the length of which can be adjusted by means of a buckle 66, is attached to the clamp strap 51 by a rivet 68.

The described carrying aid operates as follows. To transport a pair of skis 4, first the toggle catch 43 is released and the roller 33 is rotated out of the housing 10 into the position illustrated in FIGS. 2 and 3. The stop surface 18 thereby lies against the opposing surface 19 and the clasp ends 22 engage behind the lower edge 23 of the side walls 11, 12, so that the floor element 16 is held securely in this position. The housing 10 is then pushed onto the rear end of the pair of skis 4 until the floor element 16 contacts the back ends of the skis 4. When the lever 45 is then pushed into the groove 37, the toggle catch 43 is tensed beyond its dead center point. The clamp strap 38 thereby runs beneath the pivot axis defined by the free ends 44 of the lever 45, so that the tension on the strap keeps the buckle 42 pressed into the groove. Despite the slightly diverging ends of the skis 4, the grooves 37 assure that the inner surfaces of the side walls 11, 12 are pressed against the surface 7 of the skis, so that the roller device 2 is held securely. In addition, this protects the toggle catch 42 from being unintentionally released. The two sides 46 of the groove 37 further act as reinforcement. Further, the carrying strap 3 can also be fixed around the pair of skis 4 above the bindings 5.

The skis are much easier to transport because during transport a significant part of their weight is transferred through the rollers 33 to the ground. Because the roller 33 is formed as a pivoting roller, the rotational position of the skis about their longitudinal axis during transport makes no difference, making them much easier to guide. Specifically, for example, the carrying loop 67 can be suspended over the shoulder and the ski pair can thus be pulled along, which would not be possible with the known, non-pivotable rollers.

I claim:

1. Carrying aid for a pair of skis, including a housing (10) which can be pushed onto the rear end of the pair of skis (4), which housing (10) has two side walls (11, 12) which contacts the surface (7) of the skis (4) and a floor element (16) which contacts the trailing ends of the skis (4), a strap (38) to hold the skis (4) in the housing (10), and a fork (28) which can be pivoted into the housing (10) about a first pivot axis (17) arranged perpendicular to the side walls (11, 12), in which fork a roller wheel (33) is rotatably mounted, characterized in that the floor element (16) can be pivoted about the first pivot axis (17) relative to the housing (10), that the fork (28) is mounted in the floor element (16) so as to rotate about a second pivot axis (31) which is perpendicular to the first pivot axis 17 and perpendicular to and spaced from the rotational axis (32) of the roller (33), that the floor element (16) includes a stop (18) and a lockable detent means (20) to lock the roller (33) in its outwardly pivoted position relative to the housing (10), that the second pivot axis (31) is arranged approximately in the center of the underside of the housing when the roller (33) is in its outwardly pivoted position, that the strap (38) includes a clamp lock (43) which is formed as a toggle catch, that the side walls (11, 12) of the housing (10) form a groove (37) projecting toward the interior of the housing which groove (37) is spaced from the floor element (16), and the strap (38) is guided in said groove (37), and that the clamp lock (43) includes a lever (45) which is pivotably mounted in the sides (46) of the groove (37) of one side wall (11) and has a buckle (42) for adjusting the length of the strap.

2. Carrying aid according to claim 1, characterized in that it also includes a carrying strap (3) which can be attached around the pair of skis (4) above the bindings (5) and includes a clamp strap (51) with a second clamp lock (52) and a carrying loop (67) attached to the clamp strap (51).

3. Carrying aid according to claim 2, characterized in that the second clamp lock (52) is formed as a toggle catch.

* * * * *